United States Patent
Bates et al.

(10) Patent No.: US 8,082,245 B2
(45) Date of Patent: Dec. 20, 2011

(54) PROVIDING LOCATION INFORMATION WITHIN A VIRTUAL WORLD

(75) Inventors: Cary L Bates, Rochester, MN (US); Paul R Day, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 575 days.

(21) Appl. No.: 12/208,383

(22) Filed: Sep. 11, 2008

(65) Prior Publication Data

US 2010/0076970 A1    Mar. 25, 2010

(51) Int. Cl.
G06F 7/00 (2006.01)
G06F 17/00 (2006.01)

(52) U.S. Cl. ......... 707/724; 707/748; 707/751; 715/757

(58) Field of Classification Search .................. 715/706, 715/757; 707/999.003, 999.004, 999.005
See application file for complete search history.

(56) References Cited

U.S. PATENT DOCUMENTS

| | | | | |
|---|---|---|---|---|
| 2007/0035548 | A1* | 2/2007 | Jung et al. | 345/474 |
| 2007/0118420 | A1* | 5/2007 | Jung et al. | 705/10 |
| 2007/0176921 | A1* | 8/2007 | Iwasaki et al. | 345/419 |
| 2009/0254843 | A1 | 10/2009 | Van Wie et al. | |
| 2010/0064253 | A1 | 3/2010 | Bates et al. | |

OTHER PUBLICATIONS

Bates et al., U.S Patent Application entitled "Providing Users With Location Information Within a Virtual World,".
Hope, Teneo, "Personal Teleporter", Aug. 12, 2005, Second Life, 5 pages, downloaded from Second Life Forums Archive, http://forums-archive.secondlife.com/15/e2/57441/1.html.

* cited by examiner

*Primary Examiner* — Vincent Boccio
(74) *Attorney, Agent, or Firm* — Patterson & Sheridan, LLP

(57) ABSTRACT

Embodiments of the invention provide techniques for providing information describing locations to users of an immersive virtual environment. In one embodiment, patterns of locations visited by various users of the virtual environment may be stored in a searchable data structure(s). Further, characteristics of the location visits may be used to determine whether a given location visit was favorable for each user. Subsequently, locations visited by a current user may be matched to one of the stored patterns of locations. The matching pattern may then be used to provide favorability information describing other locations available to the current user. The favorability information may be presented to the user as graphical indications visible within the user's view of the virtual environment.

20 Claims, 6 Drawing Sheets

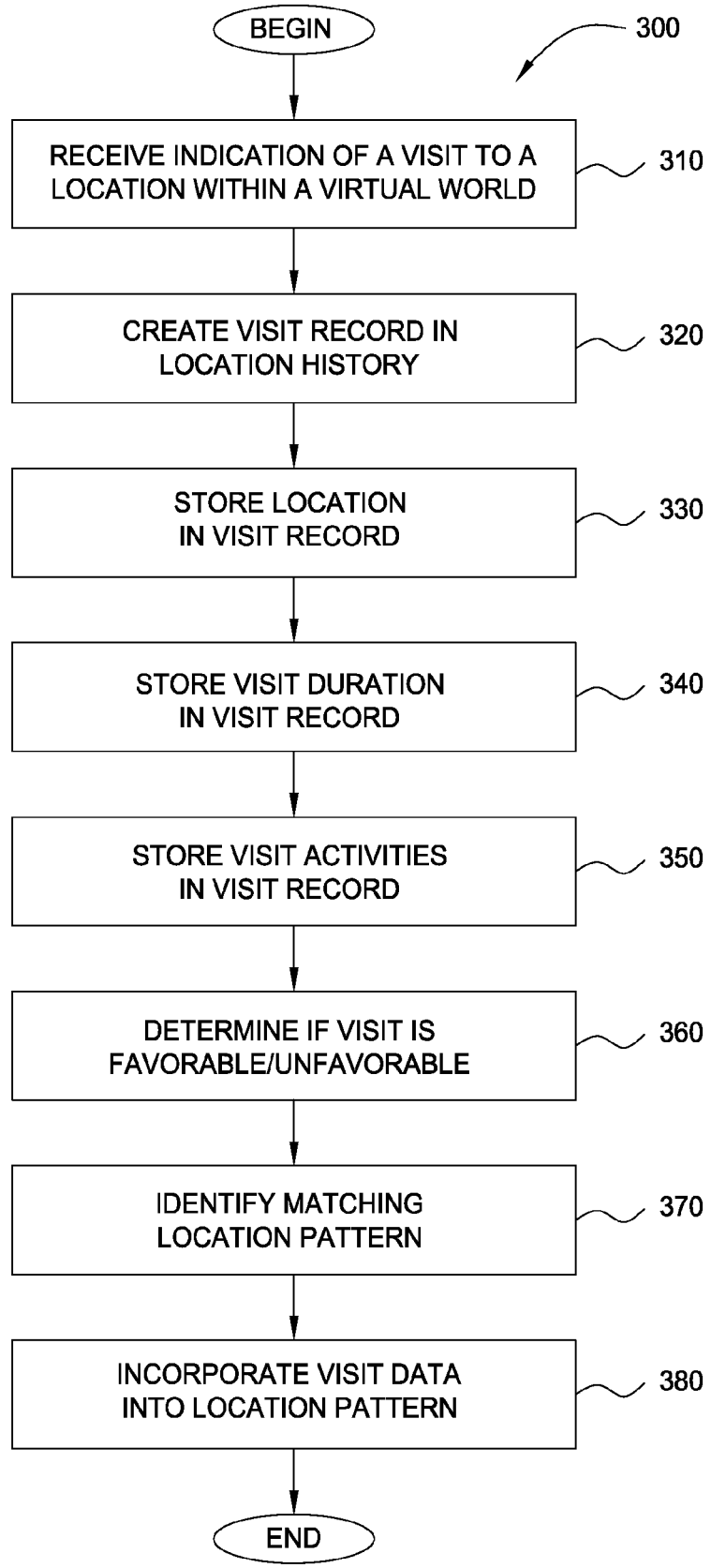

PROVIDING LOCATION INFORMATION WITHIN A VIRTUAL WORLD

BACKGROUND OF THE INVENTION

1. Field of the Invention

The field of the invention relates to immersive virtual environment presentation, specifically to providing users with information describing locations within an immersive virtual environment.

2. Description of the Related Art

A virtual world is a simulated environment in which users may inhabit and interact with one another via avatars. Users may also interact with virtual objects and locations of the virtual world. An avatar generally provides a graphical representation of an individual within the virtual world environment. Avatars are usually presented to other users as two or three-dimensional graphical representations of humanoids. Frequently, virtual worlds allow for multiple users to enter and interact with one another. Virtual worlds provide an immersive environment as they typically appear similar to the real world, with real world rules such as gravity, topography, locomotion, real-time actions, and communication. Communication may be in the form of text messages sent between avatars, but may also include real-time voice communication.

Virtual worlds may be persistent. A persistent world provides an immersive environment (e.g., a fantasy setting used as a setting for a role-playing game) that is generally always available, and world events happen continually, regardless of the presence of a given avatar. Thus, unlike more conventional online games or multi-user environments, the plot and events continue to develop even while some of the players are not playing their characters.

SUMMARY OF THE INVENTION

One embodiment of the invention includes a computer-implemented method. The method may generally include: receiving data describing visits to virtual locations by users of a virtual world, wherein each user is represented by a respective avatar within the virtual world: identifying, based on the received data, a group of users sharing one or more common characteristics; determining, based on the received data, a plurality of virtual locations visited by all members of the group of users; determining, based on the received data, a favorability rating of each of the plurality of virtual locations, wherein the favorability rating is an aggregate measure of how favorable the visits to the plurality of virtual locations were to the group of users; and storing a location pattern in a searchable data structure, wherein the location pattern comprises at least: (i) a description of the plurality of virtual locations, and (ii) the determined favorability rating of each of the plurality of virtual locations.

Another embodiment of the invention includes a computer-readable storage medium containing a program which when executed on a processor performs an operation, the operation comprising: identifying, based on the received data, a group of users sharing one or more common characteristics; determining, based on the received data, a plurality of virtual locations visited by all members of the group of users; determining, based on the received data, a favorability rating of each of the plurality of virtual locations, wherein the favorability rating is an aggregate measure of how favorable the visits to the plurality of virtual locations were to the group of users; and storing a location pattern in a searchable data structure, wherein the location pattern comprises at least: (i) a description of the plurality of virtual locations, and (ii) the determined favorability rating of each of the plurality of virtual locations.

Still another embodiment of the invention includes a system having a database, a processor, and a memory containing a program, which when executed by the processor performs an operation, the operation comprising: identifying, based on the received data, a group of users sharing one or more common characteristics; determining, based on the received data, a plurality of virtual locations visited by all members of the group of users; determining, based on the received data, a favorability rating of each of the plurality of virtual locations, wherein the favorability rating is an aggregate measure of how favorable the visits to the plurality of virtual locations were to the group of users; and storing a location pattern in a searchable data structure, wherein the location pattern comprises at least: (i) a description of the plurality of virtual locations, and (ii) the determined favorability rating of each of the plurality of virtual locations.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 is a flow diagram illustrating a method for generating a data structure for use in providing information describing locations to a user of a virtual world, according to one embodiment of the invention.

DETAILED DESCRIPTION OF THE PREFERRED EMBODIMENTS

Figure 1:
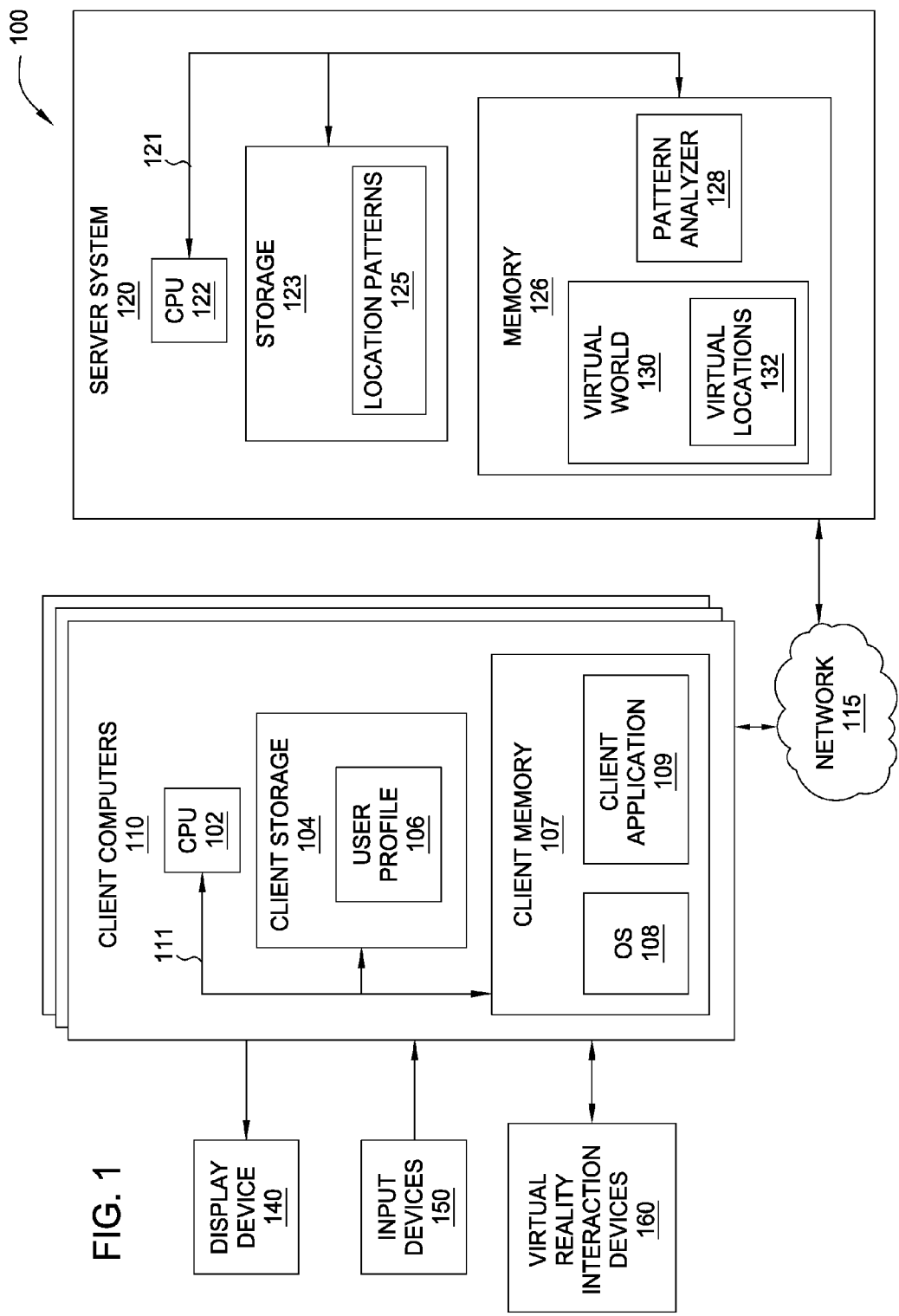
FIG. 1 is a block diagram that illustrates a client server view of computing environment, according to one embodiment of the invention.

A virtual world is a simulated environment in which users may be represented by avatars. An avatar may be used to "travel" through locations of the virtual world, such as virtual streets, buildings, rooms, etc. While an avatar is in a given location, the user represented by the avatar may be presented with options of other locations that are available to the user, meaning the user may selectively travel to another location by selecting a given option. For example, an avatar present in a hallway may be able to open any one of multiple doors present in the hallway, with each door opening to a different room.

However, a user presented with unfamiliar locations may not know what content of the virtual world is available at each location. Typically, a user would have to determine this information by a process of trial and error. This process may be tedious and time-consuming. Given information describing each location, the user may decide to avoid certain locations, and may only visit other locations.

Embodiments of the invention provide techniques for providing information describing locations to users of an immersive virtual environment. In one embodiment, patterns of locations visited by various users of the virtual environment may be stored in a searchable data structure(s). Further, characteristics of the location visits may be used to determine whether a given location visit was favorable for each user. Subsequently, locations visited by a current user may be matched to one of the stored patterns of locations. The matching pattern may then be used to provide favorability information describing other locations available to the current user. The favorability information may be presented to the user as graphical indications visible within the user's view of the virtual environment.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a client server view of computing environment 100, according to one embodiment of the invention. As shown, computing environment 100 includes client computers 110, network 115 and server system 120. In one embodiment, the computer systems illustrated in environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

In one embodiment, server system 120 includes a CPU 122, which obtains instructions and data via a bus 121 from memory 126 and storage 123. The processor 122 could be any processor adapted to support the methods of the invention. The memory 126 is any memory sufficiently large to hold the necessary programs and data structures. Memory 126 could be one or a combination of memory devices, including Random Access Memory, nonvolatile or backup memory, (e.g., programmable or Flash memories, read-only memories, etc.). In addition, memory 126 and storage 123 may be considered to include memory physically located elsewhere in a server 120, for example, on another computer coupled to the server 120 via bus 121. Server 120 may be operably connected to the network 115, which generally represents any kind of data communications network. Accordingly, the network 115 may represent both local and wide area networks, including the Internet.

Memory 126 includes a virtual world 130. In one embodiment, virtual world 130 may be a software application that allows a user to explore and interact with an immersive environment. Illustratively, virtual world 130 includes virtual locations 132, representing simulated locations that the user may inhabit and move through while in the virtual world 130.

As shown, each client computer 110 includes a central processing unit (CPU) 102, which obtains instructions and data via a bus 111 from client memory 107 and client storage 104. CPU 102 is a programmable logic device that performs all the instruction, logic, and mathematical processing in a computer. Client storage 104 stores application programs and data for use by client computer 110. Client storage 104 includes hard-disk drives, flash memory devices, optical media and the like. Client computer 110 is operably connected to the network 115.

Client memory 107 includes an operating system (OS) 108 and a client application 109. Operating system 108 is the software used for managing the operation of the client computer 110. Examples of OS 108 include UNIX, a version of the Microsoft Windows® operating system, and distributions of the Linux® operating system. (Note, Linux is a trademark of Linus Torvalds in the United States and other countries.)

In one embodiment, client application 109 provides a software program that allows a user to connect to the virtual world 130 on server 120, and once connected, to perform various user actions. Such actions may include exploring virtual locations 132, interacting with other avatars, and interacting with virtual objects. Further, client application 109 may be configured to generate and display a visual representation of the user within the immersive environment, generally referred to as an avatar. The avatar of the user is generally visible to other users in the virtual world, and the user may view avatars representing the other users. The client application 109 may also be configured to generate and display the immersive environment to the user and to transmit the user's desired actions to virtual world 130. Such a display may include content from the virtual world determined from the user's line of sight at any given time. For the user, the display may include the avatar of that user or may be a camera eye where the user sees the virtual world through the eyes of the avatar representing this user.

The user may view the virtual world using a display device 140, such as an LCD or CRT monitor display, and interact with the client application 109 using input devices 150. Further, in one embodiment, the user may interact with client application 109 and virtual world 130 using a variety of virtual reality interaction devices 160. For example, the user may don a set of virtual reality goggles that have a screen display for each lens. Further, the goggles could be equipped with motion sensors that cause the view of the virtual world presented to the user to move based on the head movements of the individual. As another example, the user could don a pair of gloves configured to translate motion and movement of the user's hands into avatar movements within the virtual reality environment. Of course, embodiments of the invention are not limited to these examples and one of ordinary skill in the art will readily recognize that the invention may be adapted for use with a variety of devices configured to present the virtual world to the user and to translate movement/motion or other actions of the user into actions performed by the avatar representing that user within virtual world 130.

In one embodiment, client application 109 may be configured to capture data describing the virtual locations 132 visited by a user of the virtual world 130 (e.g., a user of a particular client 110). For example, when the user's avatar visits a virtual location 132, the client application 109 may capture data describing when the visit occurred, the duration of the visit, any actions carried out by the user during the visit, the virtual location 132 itself, and the like. The virtual location 132 visited may be described in terms of, e.g., a location identifier, a street address, keywords describing the location, map coordinates, etc. The data captured by the client application 109 may be stored in a location history 105 included in the client storage 104. Optionally, the data describing the virtual locations 132 visited by the user may be captured and stored on the server 120. That is, such data may be captured by the virtual world 130, and the location history 105 may be included in the storage 123.

In one embodiment, memory 126 in server 120 may include a pattern analyzer 128, representing a software application configured to analyze the movements of users to determine patterns of locations visited within the virtual world 130. For example, the pattern analyzer 128 may analyze the location histories 105 of multiple users (i.e., location histories 105 stored in various clients 110) to determine common sets of virtual locations 132 visited by the users. In another example, the pattern analyzer 128 may continually monitor the virtual world 130 to detect user visits to virtual locations 132. When the pattern analyzer 128 detects a user visit, data describing the visit may be captured (e.g., an identifier for the virtual location 132, when the visit occurred, the duration of the visit, any actions carried out by the user during the visit, etc.), and may be incorporated into data describing multiple locations visits.

In one embodiment, the pattern analyzer 128 may be configured to determine whether a particular location visit was favorable or unfavorable to the user. More specifically, the pattern analyzer 128 may analyze characteristics of each visit to determine if the visit was favorable (i.e., interesting, useful, enjoyable, etc.) or unfavorable (i.e., boring, unproductive, etc.) for the user. Further, the pattern analyzer 128 may determine a favorability rating for the visit, meaning a measure of how favorable the visit was for the user. For example, the pattern analyzer 128 may determine a positive favorability rating if the user spent at least a specified amount of time at the visited location, or performed at least a specified amount of activity (e.g., interaction with objects or other avatars) at the visited location. Further, the favorability rating may be increased proportionally to any time spent and/or activity performed beyond the required thresholds defining a favorable visit. Conversely, the pattern analyzer 128 may determine a negative favorability rating (i.e., an unfavorable visit) if the user did not spent at least a specified amount of time at the visited location, or did not perform at least a specified amount of activity at the visited location. Furthermore, in some cases, the pattern analyzer 128 may determine a neutral favorability rating (i.e., the visit was neither favorable nor unfavorable), or may not determine any favorability rating for the visit. Such cases may occur, e.g., if the duration of the visit is unknown, if the activities performed during the visit are unknown, etc.

In one embodiment, the data determined by the pattern analyzer 128 (i.e., the particular virtual location 132 visited, when the visit occurred, the duration of the visit, any actions carried out by the user during the visit, the favorability rating of the visit, etc.) may be stored in the location patterns 125 included in storage 123. The location patterns 125 may represent a persistent data structure, such as an XML file, a database table, and the like. Optionally, the data describing each visit may be stored as a separate data record included in the location patterns 125. Alternatively, the descriptive data may be stored in aggregated form within the location patterns 125, for example as statistical data describing a plurality of location visits. Subsequently, location patterns 125 may be used by pattern analyzer 128 to provide descriptive information about virtual locations 132 that a user of virtual world 130 may wish to visit. More specifically, the pattern analyzer 128 may be configured to match the user's location history 105 (i.e., the locations visited by the user) to the location patterns 125 (i.e., patterns of locations visited by multiple users). Such matching is described in greater detail below with reference to FIG. 5. If a match is found, the pattern analyzer 128 may use the matching location pattern 125 to determine favorability information (i.e., whether a location is favorable or unfavorable) about virtual locations 132 that the user may visit. Such favorability information may then be presented to the user, as described below with reference to FIGS. 2A-2B.

Figure 5:
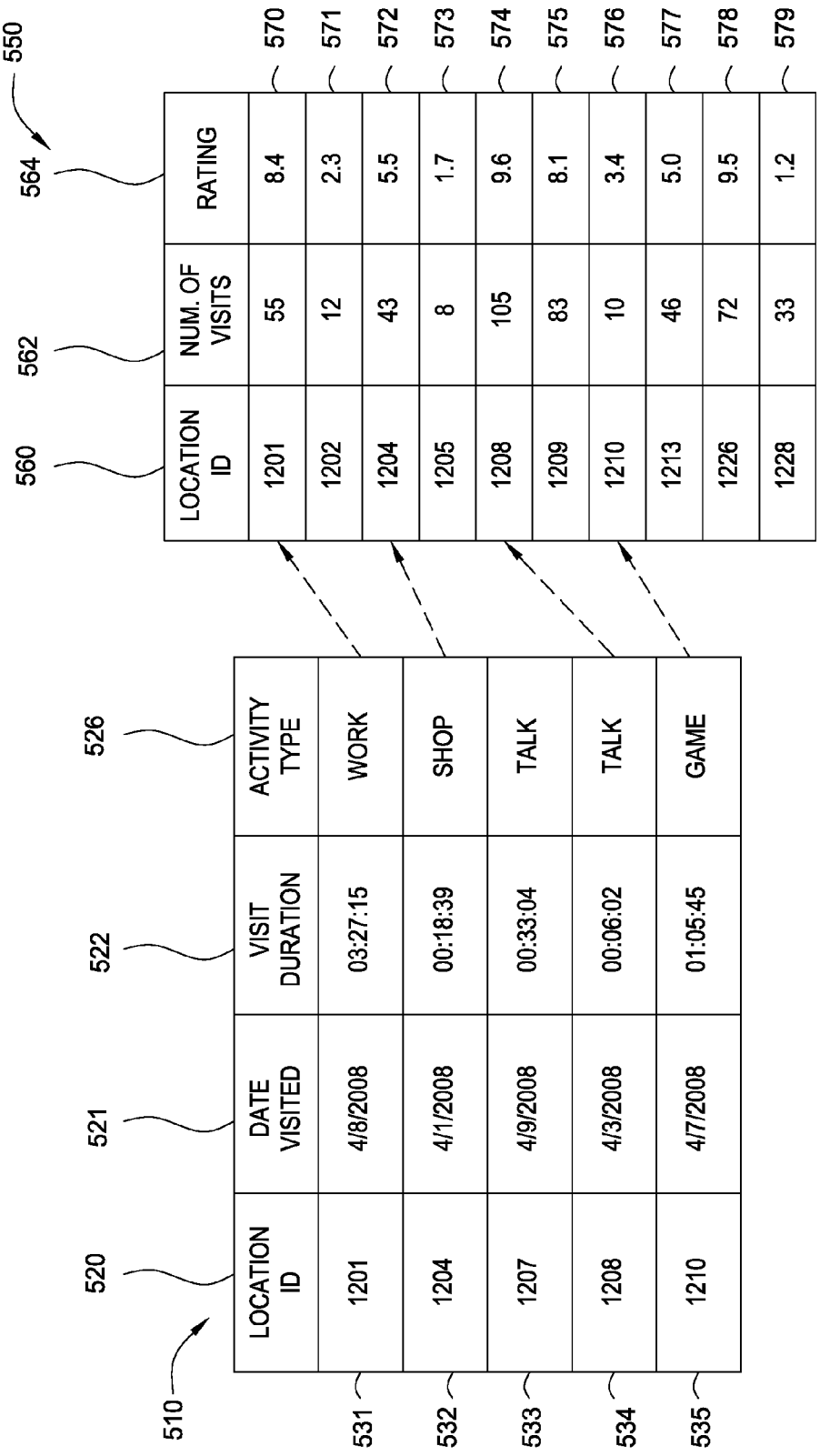
FIG. 5 is a conceptual illustration of matching a user's location history to a location pattern, according to one embodiment of the invention.

FIG. 5 is a conceptual illustration of matching a user's location history 510 to a location pattern 550, according to one embodiment of the invention. As shown, the location history 510 may be composed in the form of a data table, and may include a "LOCATION ID" column 520 storing identifiers for virtual locations 132 that the user has visited, a "DATE VISITED" column 521 storing dates of the visits, a "VISIT DURATION" column 522 storing the time durations of the visits, and an "ACTIVITY TYPE" column 526 storing descriptions of activities performed during the visits. Further, the location pattern 550 may also be composed in the form of a data table, and may include a "LOCATION ID" column 560 storing identifiers for virtual locations 132 that multiple users have visited, a "NUM. OF VISITS" column 562 storing the number of visits to each location, and an "RATING" column 564 storing favorability ratings for each location. Assume that the favorability ratings stored in the "RATING" column 564 are defined on a numeric scale from 0 to 10, with lower numbers (e.g., "1.5") indicating unfavorable locations, and higher numbers (e.g., "9.5") indicating favorable locations.

In the example illustrated in FIG. 5, four location identifiers included in the location history 510 (e.g., location identifier "1201" included in row 531) are matched (as indicated by dashed arrows) to location identifiers included in the location pattern 550 (e.g., location identifier "1201" included in row 570). In one embodiment, such matching of locations may be performed by the pattern analyzer 128 illustrated in FIG. 1. More specifically, the pattern analyzer 128 may be configured to select one (or more) of a set of the location patterns 550 by matching locations to the user's location history 510. For example, the pattern analyzer 128 may select one location pattern 550 that shares more locations with the user's location history 510 than other location patterns 550. Further, the pattern analyzer 128 may determine that a given location pattern 550 successfully matches the user's location history 510 if predefined criteria are met. For example, a successful match may require that at least four locations are shared by the location pattern 550 and the location history 510. Note that the location identifier "1207" included in row 533 is not matched in the location pattern 550. In another example, a successful match may require a majority (i.e., greater than 50%) of the locations included in the location history 510 to be shared by the location pattern 550.

In one embodiment, the pattern analyzer 128 may consider the age of the user's location history 105 in matching to a given location pattern 125. For example, assume that a first location pattern 125 (not shown) shares two locations with the user's location history 510 shown in FIG. 5, namely the locations stored in rows 531 and 533. Assume also that a second location pattern 125 (also not shown) shares two locations with the user's location history 510, namely the locations stored in rows 534 and 535. In order to determine which location pattern 125 best matches the user's location history 510, the pattern analyzer 128 may be configured to consider the most recent locations visited by the user to be more important than older locations visited by the user. Thus, the pattern analyzer 128 may select the first location pattern 125 as the best match to the user's location history 510, since the dates (stored in the "DATE VISITED" column 521) of the location visits stored in rows 531 and 533 are more recent than the location visits stored in rows 534 and 535. Further, the pattern analyzer 128 may be configured to delete location visits from the user's location history 510 after some predetermined expiration period has elapsed. For example, the pattern analyzer 128 may delete any data included in the user's location history 510 that is more than six moths old.

Once a successful match is determined, any non-matched location identifiers included in the location pattern 550 (e.g., location identifier "1226" included in row 578, location identifier "1228" included in row 579, etc.) may be used to provide information on available virtual locations 132 that the user may visit. For example, assume that the user's avatar is present at a first virtual location 132, and from that location, the user's avatar may move to the virtual locations 132 represented by the location identifiers "1226" and "1228." Since the location "1226" has a high favorability rating of "9.5," the user may be presented with an indicator (e.g., a door, a link, a menu selection, etc.) communicating that the user may visit the location "1226," and also communicating that this virtual location 132 is likely to be favorable to the user. Further, since the location "1228" has a low favorability rating of "1.2," the user may be presented with a second indicator communicating that the user may visit the location "1228," but also communicating that this virtual location 132 is likely to be unfavorable to the user.

Note that the location pattern 550 and the location history 510 shown in FIG. 5 are provided for the sake of illustration, and are not intended to limit the scope of the invention. Other embodiments of the invention are also contemplated. For example, the location pattern 550 and the location history 510 may be stored together in the client computer 110, or may be stored together in the server computer 120. In another example, the location pattern 550 and the location history 510 may be combined into a single data structure. In yet another example, the location pattern 550 and/or the location history 510 may be modified to incorporate other data describing virtual locations 132. Such modifications may be made to suit particular situations, and are thus contemplated to be in the scope of the invention.

Figure 2A:
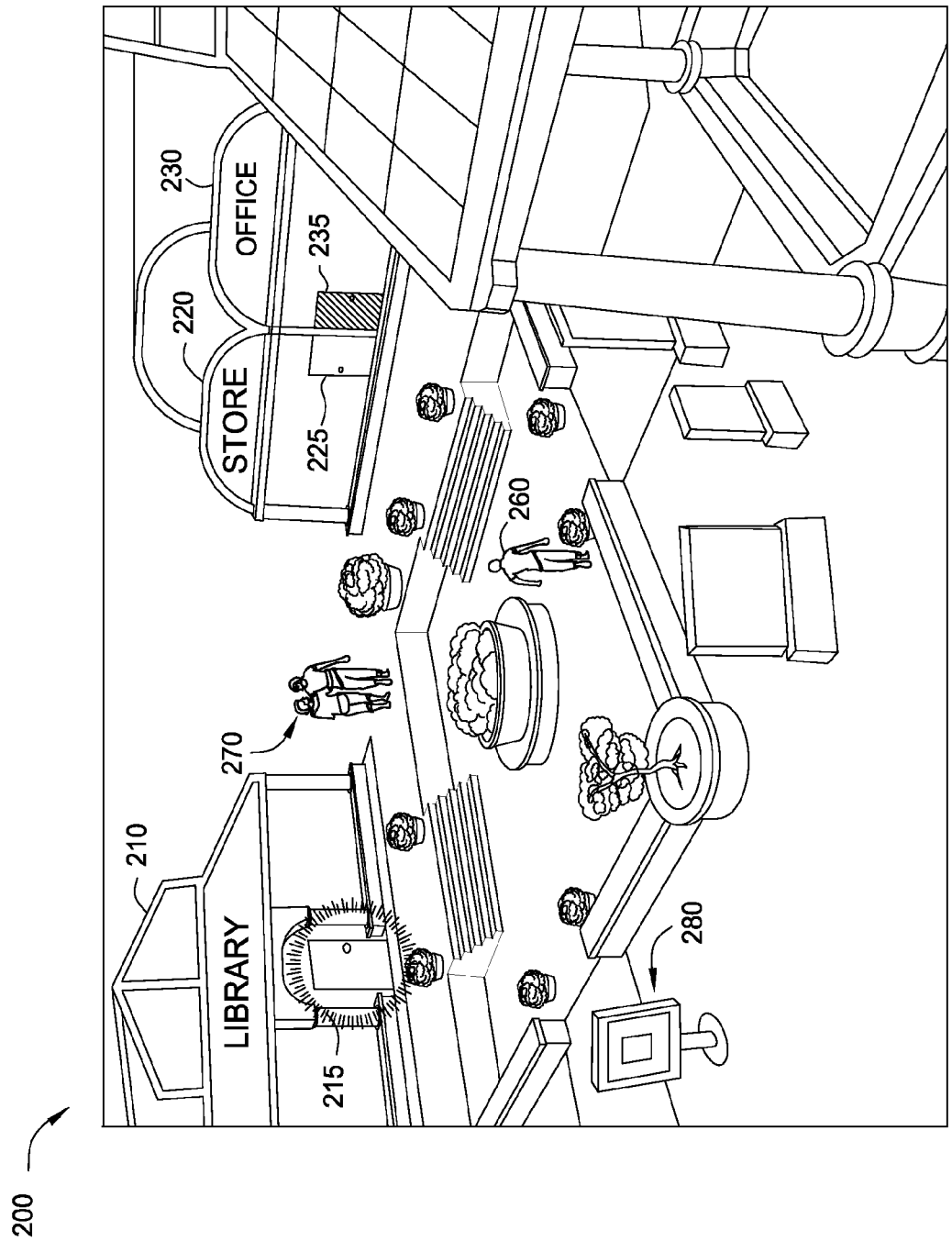
FIGS. 2A-2B illustrate a user display for a user participating in a virtual world, according to one embodiment of the invention.
Figure 2B:
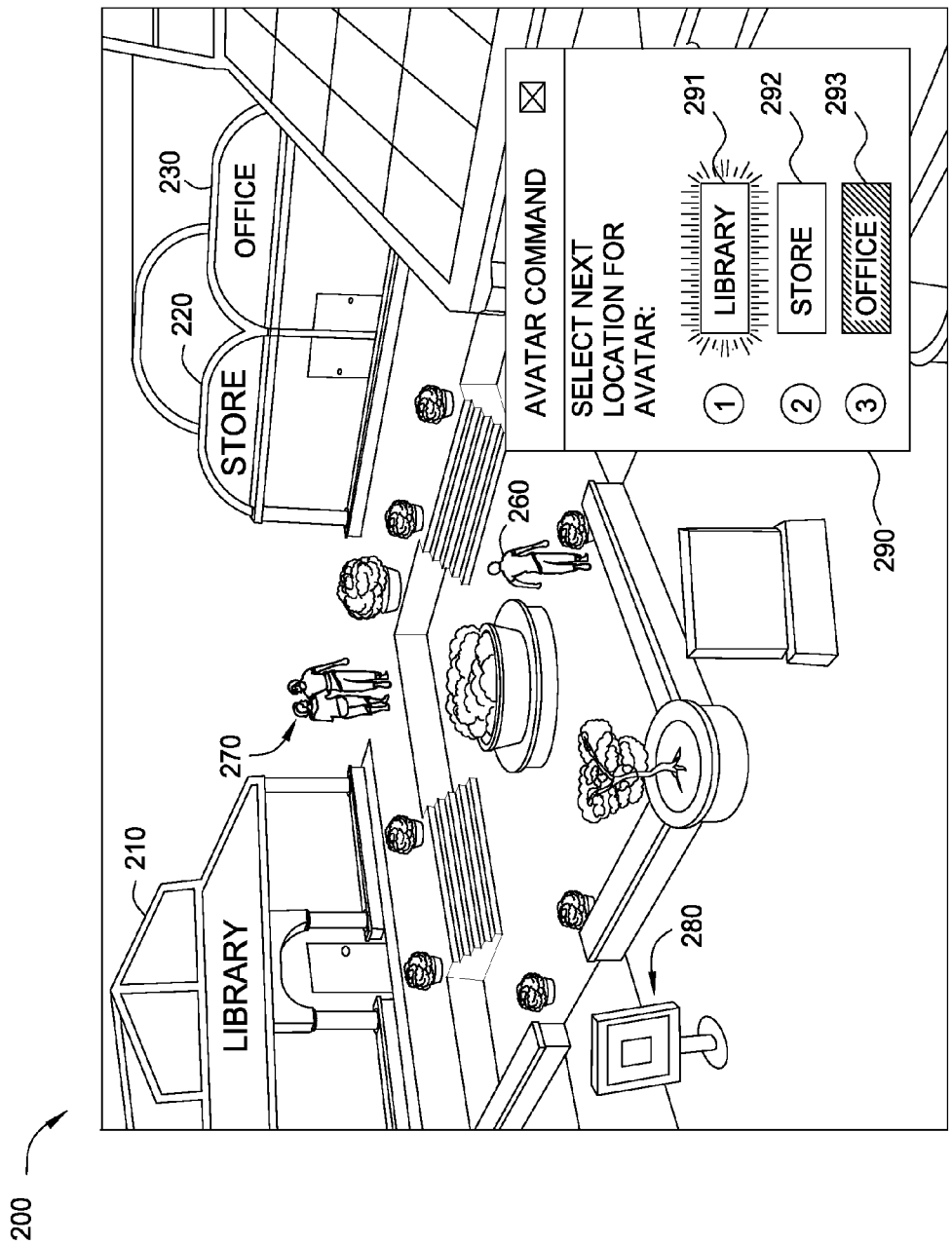

FIGS. 2A-2B illustrate a user display 200 for a user participating in a virtual world, according to one embodiment of the invention. As shown in FIG. 2A, the user display 200 is displaying a view of a virtual plaza included in the virtual world 130, with the user represented by an avatar 260. The user may interact with elements displayed in user display 200. For example, the user may interact with a kiosk 280 by operating controls built into the kiosk 280, requesting information, etc. The user may also interact with other avatars 270 by voice communication, text messages, etc. In addition, a user may travel to different virtual locations 132 by moving the avatar 260. In one embodiment, such movements may be performed by selecting graphical elements that automatically move the user's avatar to a new location. For example, the user may select door 225 (e.g., by clicking a pointing device such as a mouse). In response, the avatar 260 may enter a new virtual location 132, namely the interior of the store 220. In another example, the user may select door 235, thus causing the avatar 260 to enter the office 230.

In one embodiment, the pattern analyzer 128 may be configured to present indications of the favorability of locations to which the user may travel. Such indications may be presented to the user as graphical indications which may be visible in a user display of the virtual world. For example, referring to FIG. 2A, assume that the pattern analyzer 128 has matched the user's location history 105 to a given location pattern 125. Assume further that the matching location pattern 125 includes the library 210, and that the library 210 is described as a favorable location. Thus, the client application 109 may show the door 215 as having a highlight effect, indicating to the user that the library 210 is likely to be a favorable location to visit. Assume further that the matching location pattern 125 also includes the office 230, and that the office 230 is described as an unfavorable location. Thus, the client application 109 may show the door 235 as having a "grayed-out" shading effect, indicating to the user that the office 230 is likely to be an unfavorable location to visit. Assume further that the matching location pattern 125 does not include the store 220. Thus, the pattern analyzer 128 may not be able to determine whether the store 220 is a favorable or unfavorable location to visit. Accordingly, the door 225 is shown without any graphical indicators of being either a favorable or unfavorable location.

In one embodiment, a movement to a different location may be triggered by a command performed by the user, such as a menu selection, text command, voice command, etc. FIG. 2B illustrates an exemplary embodiment in which the user has performed a command (e.g., right-clicking a mouse cursor within the user display 200) to invoke a pop-up menu 290. As shown, the pop-up menu 290 includes three location links that the user may select to change locations, including a "LIBRARY" link 291, a "STORE" link 292, and an "OFFICE" link 293. For example, if the user selects the "LIBRARY" link 291, the avatar 260 (representing the user) may move to an interior location of the library 210. Note that the "LIBRARY" link 291 is displayed with a highlight effect, and the "OFFICE" link 293 is displayed with a "grayed-out" shading effect. As in the example illustrated in FIG. 2A, such graphical indications are intended to communicate that the pattern analyzer 128 has determined that the library is likely to be a favorable location to visit, and the office 230 is likely to be an unfavorable location to visit.

Of course, one of skill in the art will recognize that favorable and unfavorable locations may be represented by a variety of graphical indications. For example, graphical indications may include symbols (e.g., arrows, icons, traffic signs, etc.), text labels, color effects, lighting effects, line or shading effects, and the like. Further, such indications may be configured to convey degrees of favorability, for example by variations, gradations, and the like.

FIG. 3 is a flow diagram illustrating a method 300 for generating a data structure for use in providing information describing locations to a user of a virtual world, according to one embodiment of the invention. For the sake of illustration, the method 300 is described in conjunction with the system of FIG. 1. Specifically, the steps of method 300 may be assumed to be performed by the pattern analyzer 128 illustrated in FIG. 1. However, persons skilled in the art will understand that any system configured to perform the steps of the method 300, in any order, is within the scope of the present invention.

The method 300 begins at step 310 by receiving an indication of a user visit to a location within a virtual world (e.g., virtual world 130 illustrated in FIG. 1). Such indications may include an avatar (representing the user) entering a virtual location 132. For example, referring to FIG. 2A, the pattern analyzer 128 may detect that the avatar 260 has walked into the library 210. At step 320, a record of the user's visit to the virtual location 132 may be created in a location history (e.g., location history 105 illustrated in FIG. 1). At step 330, data describing the visited location may be stored in the visit record. For example, such data may include a location identifier (e.g., a street address, keywords describing the location, map coordinates, etc.). At step 340, data describing the time duration of the location visit (e.g., a number of minutes) may be stored in the visit record.

At step 350, data describing any activities performed by the user during the location visit may be stored in the visit record. For example, such data may include an action type (e.g., walk, operate, purchase, etc.), a degree of interaction involved in the action, and any elements of the virtual world 130 involved in the action (e.g., kiosk 250, another avatar, etc.). At step 360, a favorability rating for the user for the location visit may be determined. More specifically, the pattern analyzer 128 may be configured to analyze characteristics of the visit (e.g., duration of visit, number or amount of activities performed during the visit, type of activity performed, etc.) to determine a measure of how was favorable or unfavorable the visit was for the user. For example, the pattern analyzer 128 may determine the favorability rating based on the amount of time spent by the user at the visited location, based on a type or amount of activity performed by the user at the visited location, and the like. Once determined, the favorability rating may be stored in the visit record.

At step 370, a location pattern 125 (i.e., an aggregated data structure describing location visits by multiple users) may be matched to the current user. For example, the pattern analyzer 128 may identify the location pattern 125 that shares the most locations in common with the current user's location history 105. In another example, the pattern analyzer 128 may identify a location pattern 125 that has been previously matched to the current user.

At step 380, data describing the location visit (i.e., the data determined at steps 330-360) may be incorporated into the matching location pattern 125. For example, the pattern analyzer 128 may update a location pattern 125 to include the same data added to the location history 105. In one embodiment, the location patterns 125 may store data describing each location visit as a separate record. In another embodiment, the location patterns 125 may store data in aggregated form, for example as statistical data describing a plurality of location visits.

After step 380, the method 300 terminates. Of course, method 300 is provided for illustrative purposes only, and is not limiting of the invention. It is contemplated that the steps of method 300 may be modified to incorporate other data describing location visits into the location history 105 and/or the location patterns 125. Further, it is contemplated that the location history 105 and the location patterns 125 may be combined into a single data structure, which may be stored in either the client computer 110 or the server 120. Furthermore, it is contemplated that a location pattern 125 may be generated by aggregating entire location histories 105 of multiple users at a time. For example, the pattern analyzer 128 may generate a new location pattern 125 by grouping similar location histories 105 (e.g., location histories 105 that share at least 50% of the same locations). In other examples, new location patterns 125 may be generated by grouping visit data for users that are included in a defined group (e.g., a user guild or association), for users that share common interests or activities, and the like. Such modifications may be made to suit particular situations, and are thus contemplated to be in the scope of the invention.

Figure 4:
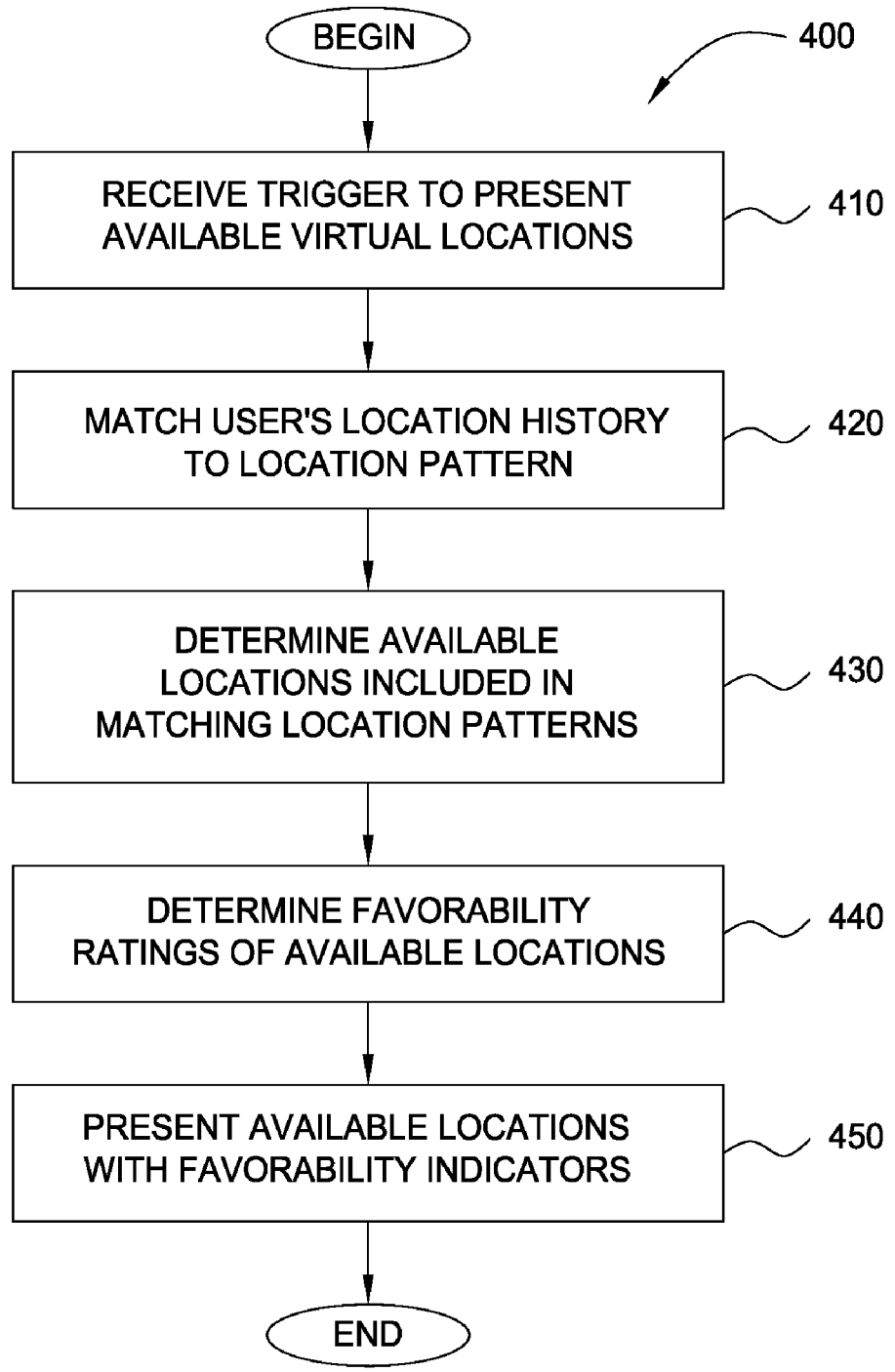
FIG. 4 is a flow diagram illustrating a method for providing information describing locations to users of a virtual world, according to one embodiment of the invention.

FIG. 4 is a flow diagram illustrating a method 400 for providing information describing locations to users of a virtual world, according to one embodiment of the invention. For the sake of illustration, method 400 is described in conjunction with the system of FIG. 1. Specifically, the steps of method 400 may be assumed to be performed by the client application 109 and/or the pattern analyzer 128 illustrated in FIG. 1. However, persons skilled in the art will understand that any system configured to perform the steps of method 400, in any order, is within the scope of the present invention.

The method 400 begins at step 410 by detecting a triggering event indicating a need to present available virtual locations 132 to a user of a virtual world 130. The triggering event may be an action or movement performed by the user. In one embodiment, a movement into a given virtual location 132 may trigger the presentation of graphical indications of other virtual locations 132 that are available for the user to visit. That is, the trigger may be an avatar's movement across a predefined threshold or checkpoint, rather than the performance of a specific action. For example, assume the avatar 260 (representing the user) enters the town square illustrated in FIG. 2A. This movement may trigger the client application 109 to present graphical indications of available virtual locations 132 that the user may move to next, namely doorways to the library 220, store 220, and office 230. In another embodiment, an action or command performed by the user may trigger the presentation of graphical indications of available virtual locations 132. For example, as illustrated in FIG. 2B, the user may perform a command (e.g., right-clicking a mouse cursor) to invoke a pop-up menu providing links to available virtual locations 132.

At step 420, the user's location history 105 may be matched to a location pattern 125. That is, the virtual locations 132 visited by the user (described by the location history 105) may be matched to a predefined set of virtual locations 132 visited by multiple users (described by a location pattern 125). In one embodiment, the location pattern 125 may be generated by using the method 300 described above. The pattern analyzer 128 may determine a successful match if the location pattern 125 shares at least a predefined number of the virtual locations 132 included in the location history 105. For example, referring to FIG. 5, the pattern analyzer 128 may determine that the location pattern 550 matches the location history 510 because they share four locations. Of course, the pattern analyzer 128 may also determine a successful match based on other criteria, for example if the location pattern 125 shares at least a predefined percentage of the virtual locations 132 included in the location history 105, the age of the user visits to the virtual locations 132 included in the location history 105, and the like.

At step 430, the pattern analyzer 128 may determine any virtual locations 132 included in the location pattern 125 that are available to the user's avatar (i.e., locations that the avatar can currently travel to). For example, referring to FIG. 5, the pattern analyzer 128 may determine that the locations "1226" and "1228" are included in the location pattern 550, and are also currently available to the user's avatar. In one embodiment, the virtual locations 132 available to the user's avatar may be limited by access privileges of the user (e.g., security permissions within the virtual world 130).

At step 440, the pattern analyzer 128 may determine favorability ratings for the available locations included in the location pattern 125. That is, the pattern analyzer 128 may determine a measure of how favorable each available location is likely to be if the user visits the location. In one embodiment, the favorability ratings may be stored in the location pattern 125, and may reflect the favorability of previous visits to a given location by multiple users. For example, referring to FIG. 5, row 578 of the location pattern 550 stores a favorability rating of "9.5," indicating a high favorability rating for the location "1226." The favorability ratings stored in the location pattern 125 may be based on, e.g., the amount of time spent by users at each location, the type or amount of activity performed by users at each location, and the like.

At step 450, the available locations may be presented along with favorability indicators. For example, referring to FIG. 2A, the client application 109 may present the user (in the user display 200) with the door 215, indicating that the user may move the avatar 260 into the library 210. As described, the door 215 is shown with a highlight effect to indicate to the user that the library 210 has a high favorability rating, and is thus likely to be a favorable virtual location 132 for the user to visit. Also, the door 235 is shown with a "grayed-out" shading effect to indicate to the user that the office 230 has a low favorability rating, and is thus likely to be a unfavorable virtual location 132 for the user to visit. After step 450, the method 400 terminates.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
   receiving data describing visits to virtual locations by users of a virtual world, wherein each user is represented by a respective avatar within the virtual world;
   identifying, based on the received data, a group of users sharing one or more common characteristics;
   determining, based on the received data, a plurality of virtual locations visited by all members of the group of users;
   determining, based on the received data, a respective favorability rating of each of the plurality of virtual locations, wherein each favorability rating is an aggregate measure of how favorable the visits to the respective virtual location of the plurality of virtual locations were to the group of users; and
   storing a location pattern in a searchable data structure, wherein the location pattern comprises at least: (i) a description of the plurality of virtual locations, and (ii) the determined favorability rating of each of the plurality of virtual locations.

2. The computer-implemented method of claim 1, wherein the data describing visits to virtual locations comprises at least one of: (i) a location identifier, (ii) a duration of the visit, and (iii) one or more activities performed by a user visiting a given virtual location.

3. The computer-implemented method of claim 1, wherein identifying a group of users sharing one or more common characteristics comprises identifying users having visited at least a predefined number of the same virtual locations.

4. The computer-implemented method of claim 1, wherein identifying a group of users sharing one or more common characteristics comprises identifying users included in a predefined group of users.

5. The computer-implemented method of claim 1, wherein determining a favorability rating of each of the plurality of virtual locations is based on the duration of the visits to the respective virtual location.

6. The computer-implemented method of claim 1, wherein determining a favorability rating of each of the plurality of virtual locations is based on one or more activities performed during each of the visits to the respective virtual location.

7. The computer-implemented method of claim 1, further comprising:
   matching a plurality of virtual locations visited by a subsequent user to at least some virtual locations described in the location pattern.

8. A computer-readable storage medium including a program, which when executed on a processor performs an operation, the operation comprising:
   receiving data describing visits to virtual locations by users of a virtual world, wherein each user is represented by a respective avatar within the virtual world;
   identifying, based on the received data, a group of users sharing one or more common characteristics;

determining, based on the received data, a plurality of virtual locations visited by all members of the group of users;

determining, based on the received data, a respective favorability rating of each of the plurality of virtual locations, wherein each favorability rating is an aggregate measure of how favorable the visits to the respective virtual location of the plurality of virtual locations were to the group of users; and storing a location pattern in a searchable data structure, wherein the location pattern comprises at least: (i) a description of the plurality of virtual locations, and (ii) the determined favorability rating of each of the plurality of virtual locations.

9. The computer-readable storage medium of claim 8, wherein the data describing visits to virtual locations comprises at least one of: (i) a location identifier, (ii) a duration of the visit, and (iii) one or more activities performed by a user visiting a given virtual location.

10. The computer-readable storage medium of claim 8, wherein identifying a group of users sharing one or more common characteristics comprises identifying users having visited at least a predefined number of the same virtual locations.

11. The computer-readable storage medium of claim 8, wherein identifying a group of users sharing one or more common characteristics comprises identifying users included in a predefined group of users.

12. The computer-readable storage medium of claim 8, wherein determining a favorability rating of each of the plurality of virtual locations is based on the duration of the visits to the respective virtual location.

13. The computer-readable storage medium of claim 8, wherein determining a favorability rating of each of the plurality of virtual locations is based on one or more activities performed during each of the visits to the respective virtual location.

14. The computer-readable storage medium of claim 8, the operation further comprising:

matching a plurality of virtual locations visited by a subsequent user to at least some virtual locations described in the location pattern.

15. A system, comprising:

a database;

a processor; and a memory containing a program, which when executed by the processor is configured to perform an operation, the operation comprising:

receiving data describing visits to virtual locations by users of a virtual world, wherein each user is represented by a respective avatar within the virtual world;

identifying, based on the received data, a group of users sharing one or more common characteristics;

determining, based on the received data, a plurality of virtual locations visited by all members of the group of users;

determining, based on the received data, a respective favorability rating of each of the plurality of virtual locations, wherein each favorability rating is an aggregate measure of how favorable the visits to the respective virtual location of the plurality of virtual locations were to the group of users; and storing a location pattern in a searchable data structure, wherein the location pattern comprises at least: (i) a description of the plurality of virtual locations, and (ii) the determined favorability rating of each of the plurality of virtual locations.

16. The system of claim 15, wherein the data describing visits to virtual locations comprises at least one of: (i) a location identifier, (ii) a duration of the visit, and (iii) one or more activities performed by a user visiting a given virtual location.

17. The system of claim 15, wherein identifying a group of users sharing one or more common characteristics comprises identifying users having visited at least a predefined number of the same virtual locations.

18. The system of claim 15, wherein identifying a group of users sharing one or more common characteristics comprises identifying users included in a predefined group of users.

19. The system of claim 15, wherein determining a favorability rating of each of the plurality of virtual locations is based on the duration of the visits to the respective virtual location.

20. The system of claim 15, wherein determining a favorability rating of each of the plurality of virtual locations is based on one or more activities performed during each of the visits to the respective virtual location.

* * * * *